Sept. 27, 1966 A. J. MEYERHOFF 3,275,843

THIN FILM SUPERCONDUCTING TRANSFORMERS AND CIRCUITS

Filed Aug. 2, 1962 4 Sheets-Sheet 1

INVENTOR.
ALBERT J. MEYERHOFF

BY Charles R. Lepchinsky

ATTORNEY

INVENTOR.
ALBERT J. MEYERHOFF
BY Charles P. Hopchinsky
ATTORNEY

THIN FILM SUPERCONDUCTING TRANSFORMERS AND CIRCUITS

INVENTOR.
ALBERT J. MEYERHOFF
BY Charles R. Kobolinsky
ATTORNEY

INVENTOR.
ALBERT J. MEYERHOFF
BY
Charles R. Lepchinsky
ATTORNEY

United States Patent Office 3,275,843
Patented Sept. 27, 1966

3,275,843
THIN FILM SUPERCONDUCTING TRANSFORMERS AND CIRCUITS

Albert J. Meyerhoff, Wynnewood, Pa., assignor to Burroughs Corporation, Detroit, Mich., a corporation of Michigan Filed Aug. 2, 1962, Ser. No. 214,355
14 Claims. (Cl. 307—88.5)

This invention relates to superconducting circuits and more particularly to thin film superconducting transformers and superconducting transformer circuits.

A superconductor is a material, such as tantalum, niobium or lead, which represents no resistance to current flow when reduced to a very low temperature near absolute zero. Such temperatures are generally obtained by immersing the superconductor materials in liquid helium. The resistance of a superconductor material decreases as its temperature decreases until at a certain temperature, called the critical temperature, the resistance sharply vanishes altogther.

Different materials have a different critical temperature and the critical temperature is lowered as the intensity of a magnetic field around the superconductor material is increased from zero. Also, application of a magnetic field of sufficient intensity will switch a superconductor material from its superconducting state into the resistive or normal state; the magnetic field necessary to destroy superconductivity is called the critical field. Accordingly, a superconducting material may be switched into the resistive or normal state by either heating it to its critical temperature or by subjecting it to its critical magnetic field.

A thin film cryotron utilizes these characteristics of superconductor materials and is a four terminal device comprising, essentially, a thin film superconductor gate portion and a thin film superconducting control portion which creates a magnetic field in response to current applied thereto that determines whether the gate portion is superconducting or resistive. Superconducting circuits, including cryotrons, are presently deposited in the form of thin films on planar substrates such as glass. Such thin film superconducting circuits usually have a superconducting shield plane that permits these circuits to be operated at higher speeds than if the shield were not used. It is highly desirable that such thin film superconducting circuits contain circuit elements such as transformers in order that the capabilities of such circuits may be increased. However, I have found that the effect of the superconducting shield plane on the thin film superconducting transformer is to materially reduce the inductance of the secondary and primary and thereby causes a substantial loss in transformation ratio.

Accordingly an object of this invention is an improved thin film superconducting transformer.

Another object of this invention is to provide a thin film transformer having an improved transformation ratio.

Another object of this invention is to improve the transformation ratio of a thin film transformer by increasing the inductance of the primary and secondary windings.

Still another object of the present invention is to provide a superconducting transformer circuit having a variable transformation ratio.

A further object of the present invention is to provide a superconducting transformer circuit having a plurality of superconducting transformers of predetermined transformation ratios which, when commonly interconnected, enable a plurality of weighted current contributions by the plurality of transformers to drive a common load.

A further object of the present invention is to present a related method of making a particularly novel superconducting transformer in a manner of thin film deposition wherein the method and the means are uncommonly interwoven.

Still another object of the present invention is to provide a method of making thin film superconducting transformers having high inductance primary and secondary windings.

In accordance with one feature of the present invention, the transformation ratio of a thin film superconducting transformer is improved by increasing the inductance of the primary and secondary windings. This is accomplished by depositing the flux linked primary and secondary turns of a thin film transformer adjacent an opening in a superconducting shield.

In accordance with another feature of the present invention, at least one winding of a thin film superconducting transformer is fabricated by depositing alternate layers of superconducting material and insulation material with the flux linked primary and secondary turns being deposited adjacent an opening in a superconducting shield.

In accordance with a further feature of the present invention a thin film superconducting transformer circuit having a variable step up ratio is provided and includes a plurality of superconducting transformers each having a primary and secondary circuit. The primary circuits of the plurality of transformers are connected in series to a source of constant current and the secondaries of the plurality of transformers are connected in parallel to a common load. Associated with, and connected to each secondary circuit, is a thin film cryotron. Each cryotron is responsive to a current applied thereto causing selected ones of the secondary circuits to be rendered inoperative whereby the magnitude of the current in the common load may be controlled.

In accordance with a still further feature of the present invention, a superconducting transformer circuit is provided which has a variety of circuit applications. For example, it may be used for converting a plurality of digits into a single continuous signal of analog information and when so used it includes a plurality of superconducting transformers each having a primary and secondary circuit. The primary circuits of the plurality of transformers are serially connected to a source of constant current and the secondaries are connected in parallel to a common load. Each of the superconducting transformers have a predetermined transformation ratio and associated with each secondary circuit is a thin film cryotron. By simultaneously applying current pulses indicative of binary data to the cryotrons, selected secondary circuits may be rendered inoperative whereby the magnitude of current in the common load is the analog signal representation of the applied digital information.

These and other features of the present invention are described in detail herein below in conjunction with the following drawings wherein.

Figure 1:
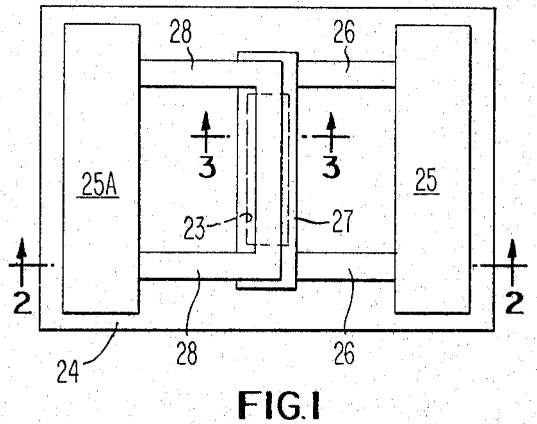
FIGURE 1 illustrates a plan view of an embodiment of the present invention.
Figure 2:
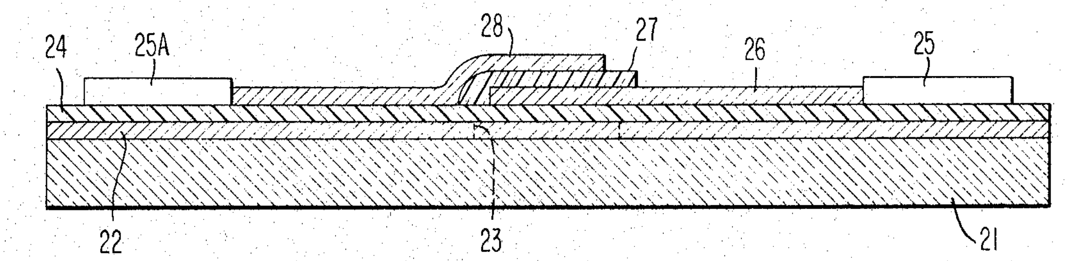
FIGURE 2 illustrates a sectional view in elevation taken along line 2—2 of FIGURE 1.
Figure 3:
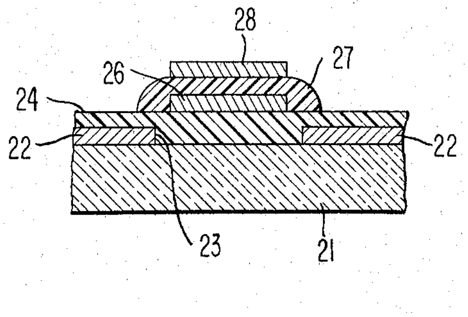
FIGURE 3 illustrates a sectional view in elevation taken along line 3—3 of FIGURE 1.

Referring now to FIGURES 1, 2, and 3, wherein like reference characters designate like or corresponding parts throughout the several views, there is shown a planar substrate 21 of a suitable material such as glass upon one flat surface of which is deposited a discontinuous shield 22 of superconducting material such as lead or tin. The discontinuous portion of the superconducting shield 22 is indicated by the reference character 23. Reference to FIGURES 1, 2, and 3 shows that the discontinuous portion 23 is in the shape of a rectangular open space in the superconducting shield 22. Deposited over the entire surface of the shield 22, including the rectangular opening 23, is a layer of insulation material 24 such as silicon monoxide.

A U-shaped piece of superconducting material 26 is deposited on the insulation layer 24 with its base portion lying adjacent the rectangular opening 23 in the superconducting shield 22. The arms or sides of the superconducting material 26 extend perpendicular from one side of the rectangular opening 23 and terminate at, and are electrically connected to, a superconducting circuit or circuits 25. Inasmuch as the superconducting circuit or circuits 25 do not constitute any part of the present invention they are shown in block form to simplify the drawings and to enable the novel features of the present invention to be more clearly shown and presented. The U-shaped piece of material 26 constitutes one winding of a superconducting transformer and its base portion, which lies adjacent the opening 23, constitutes the flux linked portion of the winding. Completely covering and extending beyond the base or flux linked portion of the superconducting material 26 is a deposited layer of insulation 27 of a suitable material such as silicon monoxide.

A second U-shaped member of superconducting material 28 has its base portion deposited on the layer of insulation 27, such that it is adjacent the base portion of the U-shaped superconducting material 26 and the rectangular opening 23 in the superconductor shield 22. The arms or sides of the U-shaped turn 28 extend perpendicularly from its base portion and terminate in, and are electrically connected to, a superconducting circuit or circuits shown as the block 25A. The base portion of the superconducting material 28 constitutes the flux linked portion of the other winding of the superconducting thin film transformer.

The base portion of the superconducting material 28 may be arbitrarily designated as the primary of the transformer and the base portion of the superconducting material 26 would then be the secondary. As is obvious to those skilled in the art, either base portion can operate as a secondary or a primary. The operation of the thin film superconducting transformer shown in FIGURES 1, 2, and 3 is such that a current applied to either U-shaped superconducting member will generate a magnetic field that is flux linked, or coupled, to the base portion of the other U-shaped superconducting material inducing a current therein.

It is obvious that the transformation ratio of the thin film transformer shown in FIGURES 1, 2, and 3 can be no more than unity. The superconducting shield 22 materially reduces the inductance in the superconducting circuits shown by blocks 25 and 25A and in the superconducting material 26 and 28 leading to the flux linked portions of the thin film transformer lying above and adjacent to the opening 23 in the superconducting shield 22. As a result of this low inductance, the superconducting circuits shown in blocks 25 and 25A may be operated at much higher speeds than if the shield 22 were not present. Accordingly the use of such a shield 22 is highly desirable and sometimes necessary for proper circuit operation.

However, it is also highly desirable that it be possible to construct superconducting circuit boards having components at thereon such as transformers. The use of transformers to couple other superconducting circuits, and for other reasons inherent in transformer characteristics, give greater capabilities, and more diverse use, to thin film superconducting circuit boards. A superconducting shield, such as shield 22, would also lower the inductance of any thin film transformer deposited adjacent to it, thereby, materially reducing the transformation ratio of the transformer. This has been overcome in the present invention by making the superconducting shield 22 discontinuous, that is, it has an opening thereon which is adjacent the flux linked portions of the primary and secondary turns. Due to this type of construction the inductance of the flux linked portions of the primary and secondary is not reduced and the theoretical maximum transformation ratio is obtained.

Accordingly, a current supplied to the U-shape superconducting winding 28, by the superconducting circuit or circuits 25A, induces a current in the U-shaped superconducting winding 26 and which is applied to the superconducting circuit or circuits 25. Also, a current can be supplied to the superconducting circuit or circuits 25A by way of the superconducting winding 28, whenever a current is supplied to the superconducting winding 26 from the superconducting circuit or circuits 25.

Figure 4:
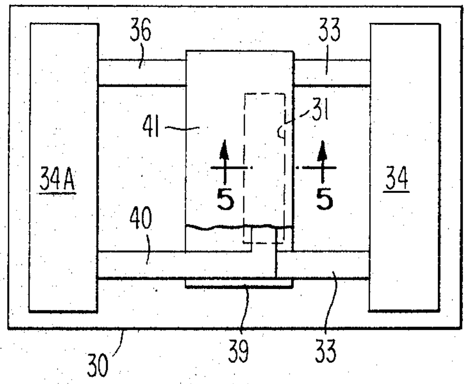
FIGURE 4 illustrates a plan view of another embodiment of the present invention.
Figure 5:
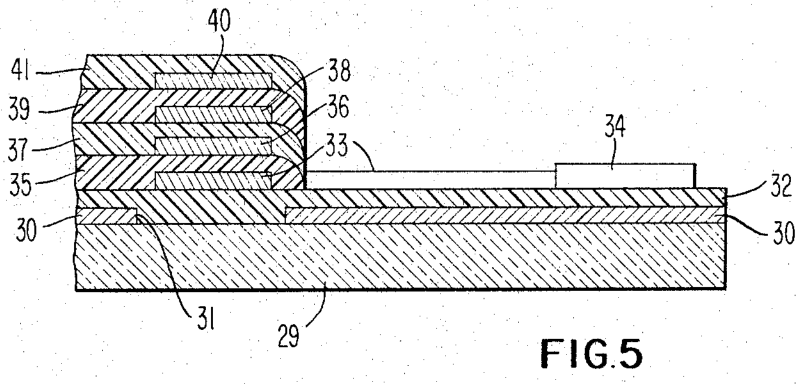
FIGURE 5 illustrates a sectional view in elevation of FIGURE 4 taken along line 5—5.

Referring now to FIGURES 4 and 5, wherein like reference characters designate like or corresponding parts, there is illustrated a thin film superconducting transformer having a one to three transformation ratio including a planar substrate 29, such as glass, upon which is deposited a shield of superconducting material 30 having an opening 31 therein. A layer of insulation material 32 is deposited over the entire surface, including the opening 31, of the superconducting shield 30. Deposited on the layer of insulation 32 is a primary U-shaped superconducting winding 33 having its base or flux linked portion adjacent the opening 31 in the superconducting shield 30. The sides or arms of the primary 33 are electrically connected to and driven by a superconducting circuit 34 which for purposes of simplicity is shown in block diagram form. Covering the flux linked portion of the superconducting primary 33 is a layer of insulation 35 upon which, and adjacent the flux linked portion of the primary 33, is deposited a first superconducting secondary winding 36. Covering the first secondary winding 36 is a layer of insulation 37 upon which is deposited another secondary winding 38. Covering the secondary winding 38 is a layer of insulation 39 upon which is deposited the third secondary winding 40 which is also covered by a deposited layer of insulation 41. The secondary of the thin film superconducting transformer is electrically connected to a superconducting circuit or circuits 34A. Reference to FIGURE 5 shows that all the flux linked primary and secondary turns lie adjacent to one another and adjacent the opening 31 in the superconducting shield 30 for reasons given above.

Figure 6:
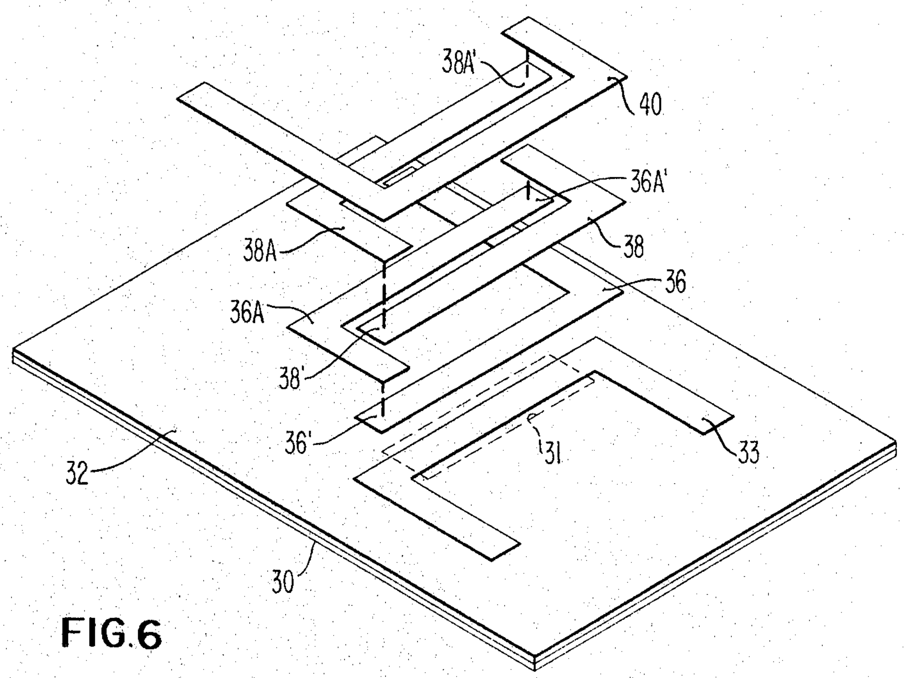
FIGURE 6 illustrates, in an exploded view, a portion of the embodiment of the present invention shown in FIGURE 4.

The winding structure of the thin film transformer shown in FIGURES 4 and 5 is more clearly illustrated in FIGURE 6 wherein there is shown a shield of superconducting material 30 having a rectangular opening 31 thereon and which is completely covered by a layer of insulation 32. The single turn primary winding 33 is deposited on the layer of insulation 32 with its flux linked or base portion adjacent the opening 31 in the shield 30. The flux linked portion of the primary 33 is then covered with a layer of insulation (not shown). The secondary winding comprises a plurality of deposited L-shaped pieces of superconducting material 36, 36A, 38, 38A and 40, interspersed with deposited layers of insulation (not shown).

The plurality of L-shaped pieces of superconducting material form a rectangular helix. Only the turns along one side of the rectangular helix thus formed lie adjacent to the opening 31 in the superconducting shield 30. It is these turns that are flux linked to the base portion of the U-shaped primary superconducting material 33. Each of the L-shaped superconducting portions 36, 36A, 38, 38A and 40 of the secondary windings are deposited individually and interspersed with deposited layers of insulation as discussed in detail herein below in conjunction with FIGURE 7. The operation of the one to three transformation ratio thin film superconducting transformer shown in FIGURES 4, 5, and 6 is substantially identical to the thin film superconducting transformer illustrated in FIGURES 1, 2, and 3. That is, the inductance of the primary and secondary winding is increased by depositing the flux link portions of these windings adjacent in opening in the superconducting shield 30, whereby the transformation ratio approaches the theoretical maximum value for the configuration.

Figure 7A:
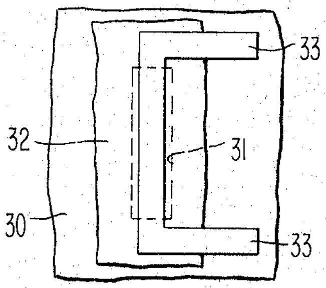
FIGURES 7A to 7L illustrate the various steps of fabricating a thin film superconducting transformer in accordance with one feature of the present invention.
Figure 7B:
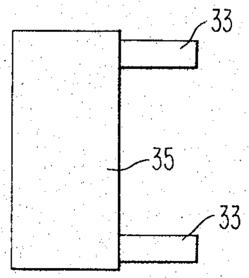

Referring now to FIGURE 7, which illustrates the various steps in constructing the transformer shown in FIGURE 5, there is shown in FIGURE 7A a shield of superconducting material 30 having a rectangular opening 31 thereon and being coated with a thin layer of insulation 32. A U-shaped portion of superconducting material 33 is deposited on the layer of insulation 32 with its base region adjacent the opening 31 in the superconducting shield 30. A layer of insulation 35 completely covers and extends beyond the base portion of the U-shaped superconducting material 33 which corresponds to a winding of a transformer, such as a primary winding, as is shown in FIGURE 7B.

Figure 7C:
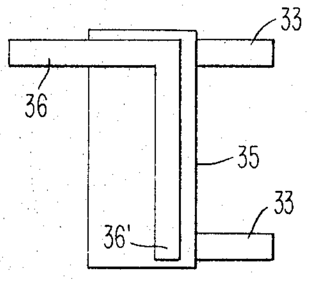
Figure 7D:
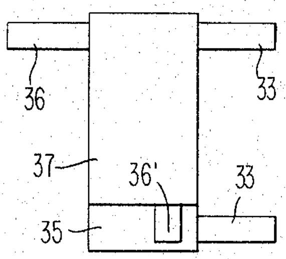
Figure 7E:
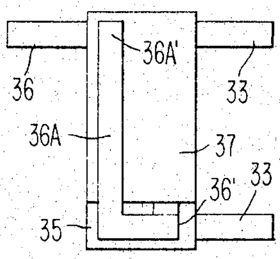

In order to build up the other winding of the transformer, such as the secondary winding, an L-shape piece of superconducting material 36, such as shown in FIGURE 7C, is deposited on the thin layer of insulation 35 such that one leg of the L completely covers and lies adjacent to the base portion of the winding 33. A thin layer of insulation 37 is then deposited over a major portion of the L-shape superconducting material 36 as shown in FIGURE 7D. A portion 36' of the superconducting material 36, lying over and adjacent to the base portion of the U-shape superconductor 33, is left exposed as shown in FIGURE 7E. Another L-shaped piece of superconducting material 36A is then deposited, such that the end of one of its legs is electrically connected to the exposed portion 36' of the previously deposited L-shape superconducting material 36 and substantially all of its other leg lays on the thin layer of insulation 37, as shown in FIGURE 7E. The first deposited L-shape 36 and the second deposited L-shape 36A form one complete turn of a rectangular helix.

Figure 7F:
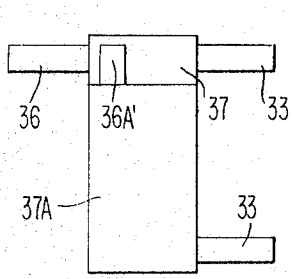
Figure 7G:
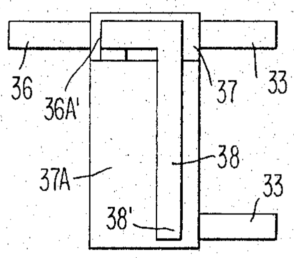
Figure 7H:
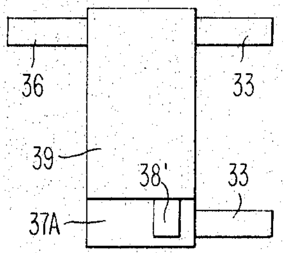
Figure 7I:
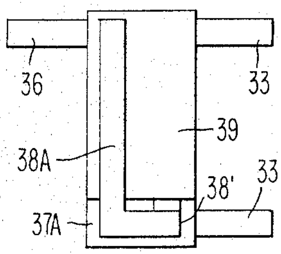

A thin layer of insulation 37A is then deposited upon, and covers all but a small exposed portion 36A' of the previously deposited L-shape superconducting material 36A, as illustrated in FIGURE 7F. Another L-shaped piece of superconducting material 38 is then deposited, having one end electrically connected to the exposed portion 36A' of the previously deposited L-shape superconducting material 36 and its other leg being deposited on the layer of insulation 37A, as shown in FIGURE 7G. A thin layer of insulation 39 is then deposited over substantially all of the L-shape superconducting material 38 leaving only a small exposed portion 38A' as shown in FIGURE 7H. Another L-shape piece of superconducting material 38A is then deposited such that one of its ends is in electrical contact with the exposed portion 38' of the previously deposited L-shaped superconducting material 38, as shown in FIGURE 7I, and its other end portion being deposited on the layer of insulation 39. At this point two complete turns of the rectangular helix have been completed with the turns being separated with deposited thin films of insulation.

Figure 7J:
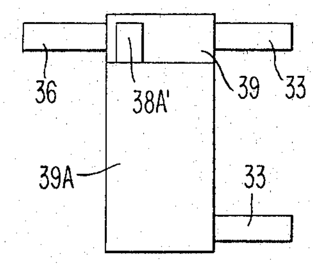
Figure 7K:
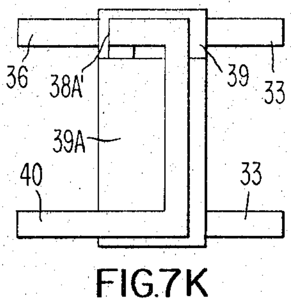
Figure 7L:
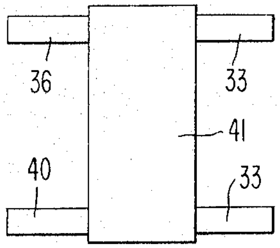

A layer of insulation 39A is then deposited, and covers all but a small exposed portion 38A' of the previously deposited L-shape 38A, as illustrated in FIGURE 7J. The last turn in the helix is now deposited as an L-shape piece superconducting material 40, having one end electrically connected to the exposed portion 38A' of the previously deposited superconducting material 38A, in a manner as illustrated in FIGURE 7K. The three turns of the rectangular helix are now completed. If desirable, an additional layer of insulation 41 may be deposited over the superconducting material 40, as shown in FIGURE 7L. The plurality of L-shaped pieces of superconducting material are in electrical connection with one another because the depositing of one end of a new section on the exposed portion of the previously deposited section electrically connects the two sections to one another.

What has been described in conjunction with FIGURES 4, 5, 6, and 7 is a thin film superconducting transformer at least one winding of which contains a plurality of superconducting turns interspersed, and insulated by, a plurality of thin layers of insulation material. The flux linked portions of the primary and secondary windings being deposited adjacent an opening in a superconducting shield thereby increasing the inductance of the primary and secondary windings which permits substantially the maximum theoretical transformation ratio to be obtained.

Figure 8:
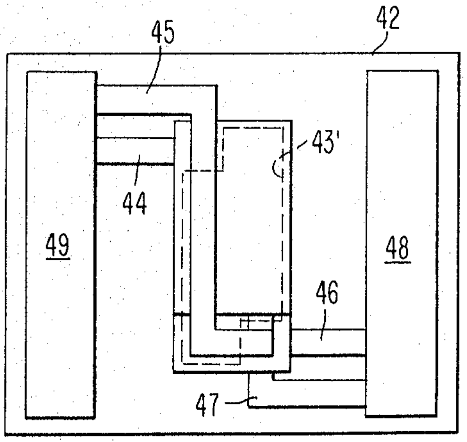
FIGURE 8 illustrates a plan view of a further embodiment of the present invention.

A further embodiment of this invention is illustrated in FIGURE 8 wherein there is shown a thin layer of insulation 42 which completely covers a shield of superconducting material having an opening 43' thereon. Deposited adjacent the opening 43' is a thin film superconducting transformer made up of rectangular windings that lie substantially entirely within the opening 43' in the superconducting material. For purposes of simplicity and clarity a one turn primary and one turn secondary is illustrated. One winding of the transformer is electrically connected to a superconducting circuit or circuits 48 by way of superconducting leads 46 and 47, and the other winding is connected to superconducting circuits 49 by way of the superconducting leads 45 and 44.

Figure 9:
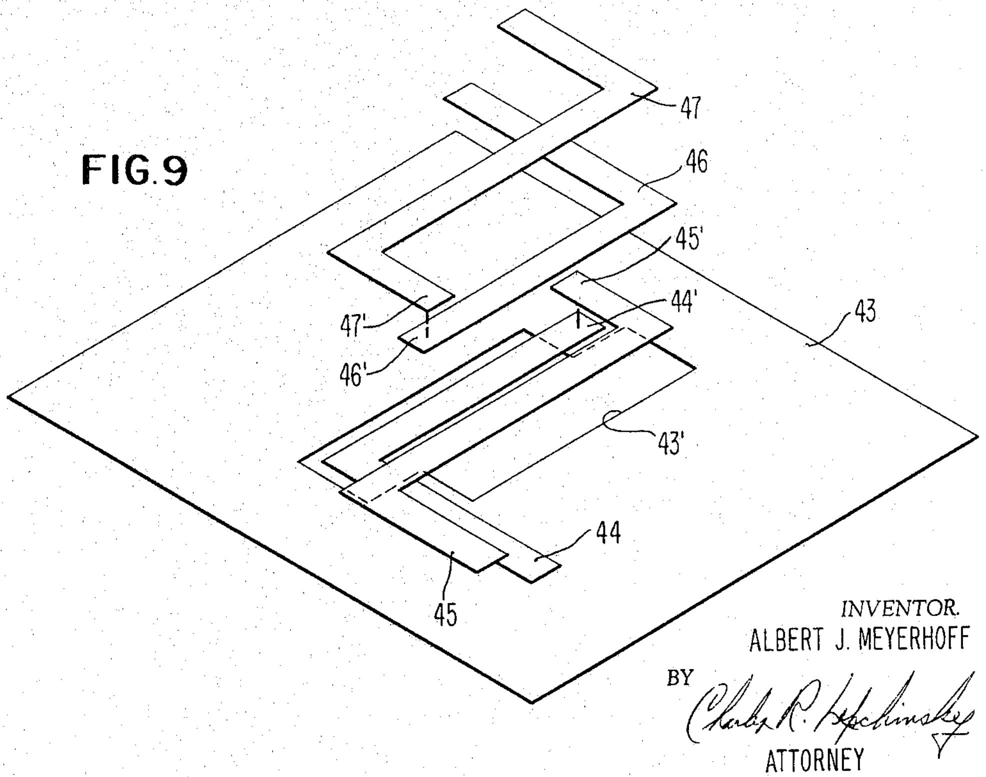
FIGURE 9 illustrates, in an exploded view, a portion of the embodiment shown in FIGURE 8.

The construction of this transformer is similar to the transformer previously described hereinabove in conjunction with FIGURES 4, 5, 6 and 7, and is illustrated in an exploded view in FIGURE 9. Referring now to FIGURE 9, there is shown a superconducting material 43 having an opening 43' thereon. A layer of insulation (not shown) completely covers the superconducting shield 43. Adjacent the opening 43' is deposited an L-shaped piece of superconducting material 44 which, except for its end 44', is substantially completely covered with a layer of insulation (not shown). A Z type piece of superconducting material 45 is then deposited adjacent the opening 43', as shown in FIGURE 9, with one of its end in electrical contact with the exposed portion 44' of the previously deposited L-shape layer of superconducting material 44. The structure thus formed constitutes one complete rectangular turn of a transformer winding. Notice that the complete rectangular winding, except for the end portions of the two pieces of superconducting material 44 and 45 not electrically connected, lie adjacent the opening 43' in the superconducting shield 43. This is in contrast to the embodiment of the present invention described in conjunction with FIGURES 4, 5, 6, and 7 wherein only one side of the rectangular windings were deposited adjacent the opening in the superconducting shield material. The construction shown in FIGURE 9 results in a larger area of flux linked primary and secondary turns that have a high inductance resulting in an improved transformation ratio over what could be obtained if a discontinuous shield were not used. The pieces of superconducting material 46 and 47 comprise the other winding of the transformer and are deposited with suitable layers of insulation (not shown) in a manner similar to the first winding previously described, to form a rectangular turn that lies adjacent the first winding and the opening 43' in the superconducting shield 43.

Figure 10:
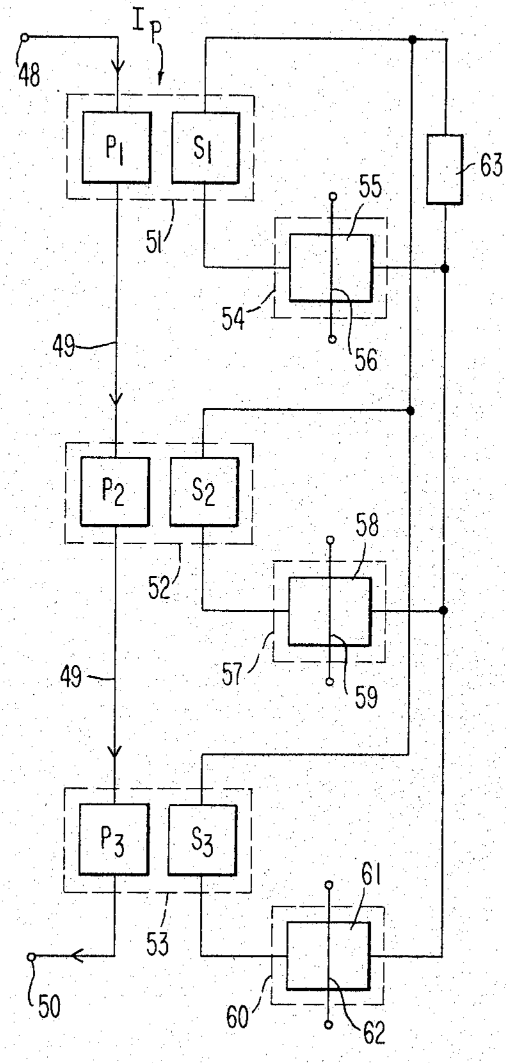
FIGURE 10 illustrates in schematic and block diagram form another embodiment of the present invention.

Referring now to FIGURE 10, there is illustrated a superconducting variable step up ratio circuit comprising a plurality of superconducting transformers 51, 52 and 53. These transformers may be of the deposited thin film variety discussed in detail hereinabove. However, the present invention shown in FIGURE 10 is not limited to a thin film superconducting transformer, for any superconducting transformer may be used. The primaries $P_1$, $P_2$, and $P_3$ are serially connected, by the superconducting lead 49, between terminals 48 and 50. A source (not shown) of constant current $I_P$ is applied to terminals 48 and 50. This current $I_P$ flows through each primary $P_1$, $P_2$, and $P_3$ of the superconducting transformers 51, 52 and 53. The secondaries $S_1$, $S_2$, and $S_3$ of the superconducting transformers are connected in parallel to a superconducting load 63.

Connected to each secondary circuit is a crossed film cryotron such as the cryotron 54 associated with the transformer 51, the cryotron 57 associated with the transformer 52, and the cryotron 60 associated with the transformer 53. Each cryotron 54, 57 and 60 respectively having a gate portion 55, 58 and 61 and a control portion 56, 59 and 62. The operation of the cryotron is such that normally the gate portion is superconducting. However, a current of sufficient magnitude applied to the control portion will create a magnetic field of sufficient intensity to cause the gate portion to become resistive.

For purposes of describing this invention, the three transformers 51, 52 and 53 will be assumed to have a unity transformation ratio. However, the present invention is not limited to transformers having such a transformation ratio. In the absence of any current applied to the control portions 56, 59 and 62 of the cryotrons 54, 57 and 60 respectively, the secondary circuits $S_1$, $S_2$ and $S_3$, of each of the three transformers 51, 52 and 53 are superconducting, and three times the magnitude of the primary $I_P$ current flows through the superconducting load 63 because the transformation ratio of each transformer is unity and the secondary of each transformer is connected in parallel to the common load 63. However, if a current is applied to the control 56, 59 and 62 of one or more of the cryotrons 54, 57 and 60, the associated gate portion will become resistive thereby reducing to zero the current that previously flowed in the associated secondary circuit which correspondingly reduces the magnitude of current flowing in the superconducting load 63. For example, assume that three units of current flow through the superconducting load 63 when all three secondary circuits are superconducting. If a current is applied to the control 62 of the cryotron 60 thereby causing its gate portion to become resistive, the current flowing through the secondary $S_3$ of the transformer 53 will be reduced to zero because the resistance of the gate portion 61 will damp out the secondary $S_3$ current. This reduces the current flowing in the superconducting load 63 to two units. Correspondingly, if a current is simultaneously applied to the control of two of the cryotrons 54, 57 or 60 the current flowing in the superconducting load 63 would be reduced to one unit. If current was simultaneously controlled to all three cryotrons no current would flow through the superconducting load 63. It is clear that the magnitude of current flowing through the superconducting loading 63 can be controlled by applying current to selected cryotrons in the secondary circuit of each of the transformers. It will be obvious to those skilled in the art that this control of load 63 current can be accomplished in fine steps by utilizing more transformers each having an associated cryotron in its secondary circuit.

The magnitude of current flowing in the load 63 may also be controlled by the use of persistent currents. For example, the current $I_P$ flowing through the primary $P_I$ of the transformer 51 induces a current in the secondary $S_1$ which is subsequently damped out by applying a current to the control 56 of the cryotron 54 which causes the gate 55 to become resistive. After the secondary current is damped out, the current applied to the control 56 can be terminated thereby causing the gate 56 to again become superconducting. If the primary current $I_P$ is terminated after the gate portion 55 becomes superconducting, a persistent current will be induced in the secondary $S_1$ which is equal and opposite to the terminated primary current $I_P$ and which will flow through the superconducting load 63. This persistent current can be induced in selected ones or all of the secondary circuits. In order not to induce a persistent current in a selected secondary circuit it is only necessary that the current applied to the control of its associated cryotron not be terminated until after the termination of the current $I_P$ flowing through the primary circuits. The use of persistent currents gives the same amount of control over the magnitude of current in the superconducting load 63 and does not require any current $I_P$ in the primaries of transformers 51, 52 and 53.

For each mode of operation of the present invention illustrated in FIGURE 10, the load 63 must remain superconducting. Such superconducting load may comprise the control portion of one or more thin film cryotrons. If the load 63 were to become resistive, the current in each of the secondaries $S_1$, $S_2$ and $S_3$ would be damped out, that is reduced to zero.

Figure 11:
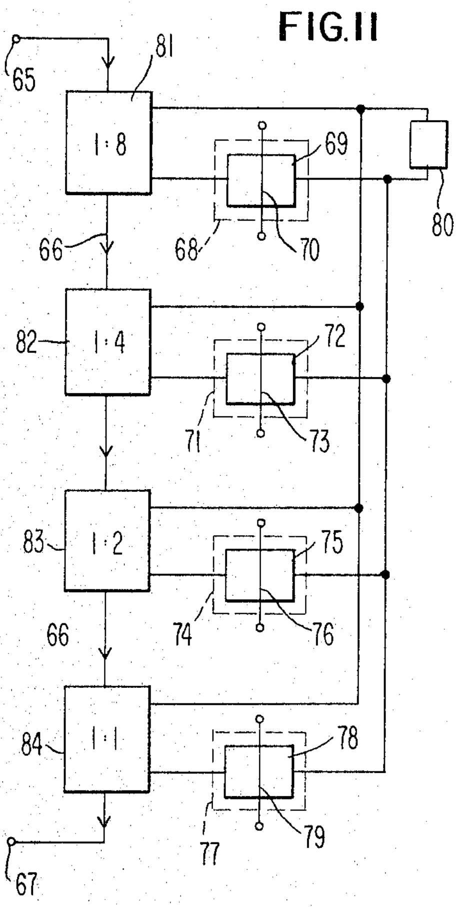
FIGURE 11 illustrates in schematic and block diagram form a still further embodiment of the present invention.

A modification of the circuit shown in FIGURE 10 is illustrated by FIGURE 11 which shows a plurality of transformers 81, 82, 83, and 84 having their primary circuits serially connected by lead to terminals 65 and 67. The secondary circuits of the plurality of transformers are connected in parallel to a common load 80. Associated with the secondary circuit of each transformer is a thin film cryotron such as cryotrons 70, 73, 76 and 79.

The operation of the embodiment shown in FIGURE 11 is substantially identical to the operation of the circuit shown in FIGURE 10 and described hereinabove. Each of the transformers 81, 82, 83, and 84 of the embodiment illustrated in FIGURE 11 may have a different predetermined transformation ratio. For example, if it is desired, the currents contributed by each transformer to the common load may be weighted, according to the digits of the binary code as shown in FIGURE 11. Consequently, the transformer 81 has a one to eight transformation ratio, the transformer 82 a one to four transformation ratio, the transformer 83 a one to two transformation ratio, and transformer 84 a unity transformation ratio. By simultaneously applying current pulses indicative of binary data to the control portions 70, 73, 76 and 79 of the cryotrons 68, 71, 74 and 77 which cause their associate gate portions 69, 72, 75 and 78 to become resistive, the magnitude of current flowing in the superconducting load 80 is the analog converted equivalent of the binary data. For this operation the most significant binary bit value is applied to the cryotron 68 and the least significant binary bit value is applied to the cryotron 77. For example, assume that the binary number seven is applied to the cryotrons 68, 70, 71, 74 and 77; and that a ONE is the absence of the current pulse and a ZERO is the presence of a current pulse. The number seven can be written in binary form as 0111. In that event, a current pulse would be applied to the control 70 of the cryotron 68 associated with the transformer 81. This current pulse causes the gate portion 69 of the cryotron to become resistive thereby damping out any secondary current supplied to the load 80 by the transformer 81. No current pulse is applied to the control 73 of the cryotron 71, to the control 76 of the cryotron 74, or to the control 79 of cryotron 77 in as much as a binary ONE, represented by an absence of a pulse, occupies the bit positions represented by these cryotrons. Therefore, the transformer 82 supplies four units of current to the load 80 due to its transformation ratio, the transformer 83 supplies two units to the load 80 due to its transformation ratio, and the transformer 84 supplies one unit of current to the load 80 due to its transformation ratio. Therefore seven units of the current are supplied to the load 80 which is the analog of the binary data applied to the cryotrons 68, 70, 71, 74 and 77. It will be obvious to those skilled in the are that the analog equivalent of any binary number from ZERO through fifteen can be generated through the load 80. If a binary system is used wherein a ONE is the presence of a current pulse and a ZERO is denoted by the absence of current pulse, it is necessary to complement the binary number before it is applied in bit parallel to the cryotrons 68, 71, 74 and 77. The transformers 81, 82, 83 and 84 may be the deposited thin film type described hereinabove in detail in conjunction with FIGURES 4, 5, 6, and 7, but it is to be understood that this embodiment of the present invention is not limited to this type superconducting transformer, for any type of superconducting transformer can be used.

What I claim is:

1. A thin film superconducting transformer comprising: means for increasing the inductance of the primary and secondary of said thin film transformer thereby improving the transformation ratio of said transformer including a deposited thin film shield of superconducting material having at least one opening thereon, said thin film superconducting transformer having its flux-linked primary and secondary windings deposited in an adjacent plane within the projected area of said opening on said shield and a thin film of insulation separating said shield and said transformer.

2. A thin film superconducting transformer comprising: a planar substrate, a thin film shield of superconducting material having at least one opening thereon deposited on said substrate, a thin film of insulation deposited on said superconducting shield, a thin film superconducting transformer having its flux-linked primary and secondary turns deposited on said insulation in an adjacent plane within the projected area of said opening on said shield, at least one winding of said thin film superconducting transformer characterized by a plurality of alternate layers of deposited thin film superconducting material and alternate layers of deposited thin film insulation material.

3. A superconducting circuit board comprising: a planar substrate, a thin film shield of superconducting material having at least one opening thereon deposited on one side of said substrate, a thin film of insulation deposited on said superconducting shield, superconducting circuit means deposited on said insulation in an adjacent plane within the projected area of said shield, a thin film superconducting transformer having its flux linked primary and secondary turns deposited on said insulation adjacent said opening on said shield, said superconducting transformer electrically coupled to said superconducting circuit means, and at least one winding of said thin film superconducting characterized by alternate layers of deposited thin film superconducting material interspersed with alternate layers of deposited thin film insulation material.

4. A thin film superconducting circuit comprising: a plurality of superconducting transformers each having means for increasing the inductance of the primary and secondary of said transformer including a shield of superconducting material having at least one opening thereon, each said superconducting transformer having its flux linked primary and secondary windings deposited in an adjacent plane within the projected area of said opening on said shield, said primaries of said plurality of said transformer being connected in series; said secondaries of said plurality of transformers being connected in parallel; means coupled to the secondary winding circuits of said transformers for selectively causing said respective secondary winding circuits to become resistive to control the current flow available therefrom.

5. A thin film superconducting circuit comprising: a plurality of superconducting transformers each having means for increasing the inductance of the primary and secondary of said transformer including a shield of superconducting material having at least one opening thereon, each said superconducting transformer having its flux linked primary and secondary windings deposited in an adjacent plane within the projected area of said opening on said shield, said primaries of said plurality of said transformer being connected in series; said secondaries of said plurality of transformers being connected in parallel; a plurality of thin film cryotrons coupled to the secondary of each said superconducting transformer; and each said cryotron adapted to become resistive in response to a current applied thereto.

6. A thin film superconducting circuit comprising: a plurality of deposited thin film superconducting transformers each having means for increasing the inductance of the primary and secondary of said transformer including a deposited thin film shield of superconducting material having at least one opening thereon, said opening on said shield located in an adjacent plane opposite to the flux linked primary and secondary windings of each said transformer; said primaries of said plurality of said transformer being connected in series and adapted to receive a current; said secondaries of said plurality of transformers being connected in parallel to a common superconducting load; a plurality of thin film cryotrons coupled to the secondary of each said superconducting transformer; and each said cryotron adapted to become resistive in response to a current applied thereto whereby selected secondary circuits may be rendered resistive.

7. A thin film superconducting circuit comprising: a plurality of superconducting transformers each including a superconductive shielding means with an opening therein for increasing the inductance thereof and each having a primary and a secondary circuit located within the projected area of said opening, said primary circuits of said plurality of transformers being serially connected, said secondaries of said plurality of transformers being connected in parallel to a common load, a plurality of deposited thin film cryotrons associated with each said secondary circuit, and each said cryotron adapted to become resistive in response to a current applied thereto.

8. A superconducting circuit comprising: a plurality of thin film superconducting transformers each including a superconductive shielding means with an opening therein for increasing the inductance thereof and each having a superconducting primary and a superconducting secondary circuit located within the projected area of said opening, said primary circuits of said plurality of transformers being serially connected, said secondaries of said plurality of transformers being connected in parallel to a common superconducting load, a plurality of deposited thin film cryotrons connected in each said secondary circuits, and each said cryotron adapted to become resistive in response to a current applied thereto whereby selected secondary circuits are rendered resistive.

9. A thin film superconducting circuit comprising: a plurality of deposited thin film superconducting transformers each including a superconducting shielding means with an opening therein for increasing the inductance there and each having a primary and a secondary circuit located within the projected area of said opening, said primary circuits of said plurality of transformers being serially connected and adapted to receive a current, said secondaries of said plurality of transformers being connected in parallel to a common thin film superconducting load, a plurality of deposited thin film cryotrons associated with each said secondary circuit, and each said cryotron adapted to become resistive in response to a current applied thereto whereby the magnitude of current flowing in said common load may be controlled.

10. A superconducting circuit comprising: a plurality of superconducting transformers each including a superconductive shielding means with an opening therein for increasing the inductance thereof and each having a primary and a secondary circuit located within the projected area of said opening, said primary circuits of said plurality of transformers being serially connected and adapted to receive a current, said secondaries of said plurality of transformers being connected in parallel to a common superconducting load, means for varying the magnitude of current flowing through said common load including, a plurality of cryotrons each associated with a said secondary circuit.

11. A thin film superconducting circuit for producing a variable transformation ratio comprising: a plurality of deposited thin film superconducting transformers each including a superconductive shielding means with an opening therein for increasing the inductance thereof and each having a primary and a secondary circuit located within the projected area of said opening, said primary circuits of said plurality of transformers being serially connected and adapted to receive a current, said secondaries of said plurality of transformers being connected in parallel to a common thin film superconducting load, and means for varying the magnitude of current flowing through said common load including, a plurality of thin film cryotrons each connected in a said secondary circuit.

12. A superconducting circuit comprising: a plurality of superconducting transformers each including a superconductive shielding means with an opening therein for increasing the inductance thereof and each having a primary and a secondary circuit located within the projected area of said opening, each said transformer having a predetermined transformation ratio, said primary circuits of said plurality of transformers being serially connected, said secondaries of said plurality of transformers being connected in parallel to a common load, and means for providing a magnitude of current flow through said common load which is indicative of a numeric value including, a plurality of cryotrons each coupled to a said secondary circuit and adapted to become resistive in response to current pulses.

13. A superconducting circuit comprising: a plurality of deposited thin film superconducting transformers each including a superconductive shielding means with an opening therein for increasing the inductance thereof and each having a primary and a secondary circuit located within the projected area of said opening, each said transformer having a predetermined transformation ratio, said primary circuits of said plurality of transformers being serially connected and adapted to receive a current, said secondaries of said plurality of transformers being connected in parallel to a common superconducting load, a plurality of deposited thin film cryotrons connected in each said secondary circuit, and each said cryotron adapted to become resistive in response to a current applied thereto.

14. A superconducting circuit comprising: a plurality of thin film superconducting transformers each having means for increasing the inductance of the primary and secondary of said transformers including, a deposited thin film shield of superconducting material having at least one opening thereon, said opening on said shield located in an adjacent plane opposite the flux linked primary and secondary windings of each said transformer; each said transformer having a predetermined transformation ratio; said primaries of said plurality of said transformers being connected in series and adapted to receive a current; said secondaries of said plurality of transformers being connected in parallel to a common superconducting load; a plurality of thin film cryotrons coupled to the secondary of each said superconducting transformer; and each said cryotron adapted to become resistive in response to a current pulse, whereby selected secondary circuits may be rendered inoperative.

References Cited by the Examiner

UNITED STATES PATENTS

| | | | |
|---|---|---|---|
| 2,716,268 | 8/1955 | Steigerwalt | 29—155.5 |
| 2,757,443 | 8/1956 | Steigerwalt | 29—155.5 |
| 2,909,769 | 10/1959 | Spaulding | 340—347 |
| 2,914,758 | 11/1959 | Retzinger | 340—347 |
| 3,054,978 | 9/1962 | Schmidlin | 338—25 |
| 3,058,851 | 10/1962 | Kahan | 117—212 |
| 3,086,130 | 4/1963 | Meyers et al. | 307—88.5 |
| 3,090,023 | 5/1963 | Brennemann et al. | 338—32 |
| 3,158,502 | 11/1964 | Bremer | 117—212 |
| 3,184,674 | 5/1965 | Garwin | 323—44 |
| 3,185,862 | 5/1965 | Beesley | 307—88.5 |
| 3,196,410 | 7/1965 | Davies | 340—173.1 |
| 3,214,679 | 10/1965 | Richards | 323—44 |

JOHN F. COUCH, *Primary Examiner*

MALCOLM A. MORRISON, LLOYD McCOLLUM, *Examiners.*

L. W. MASSEY, W. E. RAY, *Assistant Examiners.*